United States Patent Office 3,480,659
Patented Nov. 25, 1969

3,480,659
HYDROGENATION PROCESS
Kenneth C. Dewhirst, San Pablo, Calif., assignor to Shell Oil Company, New York, N.Y., a corporation of Delaware
No Drawing. Filed July 19, 1965, Ser. No. 473,222
Int. Cl. C07c *121/32, 49/20, 47/20*
U.S. Cl. 260—465.1       9 Claims

ABSTRACT OF THE DISCLOSURE

A homogeneous hydrogenation process employs a catalyst composition comprising certain rhodium hydride complexes incorporating stabilizing phosphine or carbonyl ligands and an excess of phospine ligands.

This invention relates to an improved process for the hydrogenation of unsaturated organic compounds, and to a novel catalyst composition employed therein.

The hydrogenation of unsaturated organic compounds by contact with molecular hydrogen in the presence of a hydrogenation catalyst has been extensively investigated. Broadly speaking, such processes are classifiable into two general categories depending upon the physical phase in which the catalyst is present during the hydrogenation process. In one process type, herein referred to as a heterogeneous hydrogenation process, the catalyst is essentially insoluble in the reaction medium. Typical heterogeneous catalysts include transition metals, e.g., nickel, cobalt, platinum, palladium and the like, as well as the oxides thereof, e.g., platinum oxide and palladium oxide, or mixed oxide catalysts such as copper chromite. Heterogeneous hydrogenation catalysts are customarily employed as pure materials in a finely divided state or are alternatively employed supported on inert carriers. Certain difficulties are inherent in heterogeneous catalysis. Among these are problems of maintaining contact between reactants and catalyst in the multiphase reaction system and of maintaining catalyst activity in view of the known tendency for the surface of heterogeneous catalysts to become "posioned" by irreversible adsorption of reactant molecules or impurities in the reaction system, particularly low molecular weight sulfur-containing impurities.

These difficulties are largely overcome by utilization of a homogeneous hydrogenation catalyst, that is, a catalyst which is essentially completely soluble in the reaction medium. Substantially less is known about the formation or operation of homogeneous catalysts. In general, these catalysts are prepared in situ by reduction of a transition metal salt, e.g., an iron or cobalt salt, with an aluminum alkyl or similar reducing agent. Such homogeneous catalysts are generally characterized by instability and short catalyst life, and are neither isolable nor suitable for storage and subsequent use. In addition, the requirement for in situ formation of catalyst through the use of a reducing agent adds to the process handling difficulty and increases the process cost. It would be of advantage to provide a more satisfactory homogeneous hydrogenation catalyst which is efficiently utilized in a variety of hydrogenation applications.

It is an object of the present invention to provide an improved process for the hydrogenation of unsaturated organic compounds and to provide a novel catalyst composition which is employed in such processes. More particularly it is an object to provide a novel homogeneous hydrogenation catalyst composition and the consequently improved homogeneous hydrogenation process which employs this catalyst composition.

It has now been found that these objects are accomplished by the provision of catalyst compositions comprising certain rhodium hydride complexes containing organic complexing ligands and an excess of complexing ligand. Although the hydridorhodium-organic ligand complex is itself, on occasion, useful as a hydrogenation catalyst, the presence of excess organic ligand in the catalyst composition greatly increases catalyst life and thereby increases the efficiency of the hydridorhodium complex as a hydrogenation catalyst. The composition of the invention are eminently suited for catalyzing the hydrogenation of numerous unsaturated organic molecules and exhibit utility in applications wherein prior homogeneous catalysts have not been suitable.

The rhodium hydride complex employed in the process of the invention comprises a rhodium atom bonded to at least one hydride substituent and complexed with at least three complexing ligands, at least a portion of which are organic in character. Without wishing to be bound by any specific theory, it is apparent that the rhodium hydride complex undergoes chemical changes during its participation in the hydrogenation process, so that no one formula suitably describes the actual catalytic species. In one modification of the process of the invention, catalyst is introduced in a form represented by the formula $$L_4RhH$$

wherein L represents a complexing ligand site in a stabilizing ligand as will be defined below. Although alternate methods are available for calculating the oxidation state of the rhodium in the above complex, this form of the catalyst is herein considered to be a hydridorhodium (I) complex and to have a coordination number of 5. It is considered likely that under the conditions of the hydrogenation processes wherein the catalyst is utilized, i.e., in contact with molecular hydrogen, the hydridorhodium (I) complex is transformed to a complex containing rhodium in a higher oxidation state, herein termed a rhodium (III) complex and represented by the formula $$L_3RhH_3$$

wherein L has the previously stated significance, by reaction with molecular hydrogen to effectively replace one L ligand with two atoms of hydrogen, thereby forming the above-depicted trihydridorhodium (III) complex which is considered to have a coordination number of 6. It is thought probable that the rhodium (III) complex functions during the hydrogenation process as a "hydrogen carrier." Transfer of hydrogen from the rhodium (III) complex to an unsaturated organic molecule, which may also become transiently complexed with the rhodium, results in a return to the rhodium complex with the lower coordination number upon combination with ligand present in the system, whereupon the cycle is repeated.

It is therefore apparent that a number of related rhodium hydride complexes of varying numbers of hydrogen substituents are utilizable as catalyst or catalyst precursor. These complexes are generically classified as rhodium hydride complexes containing from three to four L moieties as will be defined hereinbelow for each atom of rhodium and at least one hydrogen substituent on each rhodium, with the number of hydrogen substituents present in the rhodium complex molecule being three when the number of L moieties is three. A preferred class of such rhodium complexes is represented by the formula $$L_mRhH(H_2)_n$$

wherein L has the previously stated significance, $m$ is a whole number from 3 to 4 inclusive, $n$ is a whole number from 0 to 1 inclusive, and the sum of $m$ and $n$, i.e., the term $(m+n)$, is 4.

The term L as employed in the above formulas independently represents a complexing site in one of the stabilizing ligands complexed with the rhodium in the complexes of the invention. By the term "complexing site" is meant the portion of the ligand molecule capable of entering into complex formation with the rhodium moiety, as by partial donation of an unshared electron pair to an unfilled orbital of the rhodium. Although organic ligands such as olefin, phenol, thiophenol and the like are in part operable, best results are obtained when the complexing ligand independently is carbonyl, i.e., is a CO ligand, or is a tertiary phosphine ligand, particularly a tertiary mono- to di-phosphine ligand. From consideration of the molecular structure of this class of preferred ligands, it is apparent that the carbonyl ligand and the tertiary mono-phosphine ligand are monodentate ligands, that is, are ligands incorporating only one complexing site in the molecular structure thereof. Thus, the term "L" is representative of a carbonyl ligand or a tertiary mono-phosphine ligand as well as the single complexing site therein. Alternatively, the tertiary di-phosphine ligand is a bidentate ligand, i.e., a ligand wherein there are two complexing sites available due to the presence of the two phosphorus moieties therein. Thus, when the rhodium complexes of the invention incorporate di-phosphine ligands, two of the above-depicted L groups taken together are representative of the bidentate di-phosphine ligand.

When the complexing ligand is a tertiary mono- to di-phosphine, that is, a phosphine ligand of from 1 to 2 phosphorus atoms wherein each valence of each phosphorus is satisfied by bonding directly to a carbon atom of an organo moiety, preferred tertiary mono- to di-phosphines are represented by the formula

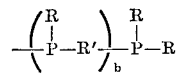

wherein $b$ is a whole number from 0 to 1 inclusive, R independently is a monovalent organic moiety attached by a bond directly from a carbon atom thereof to the indicated phosphorus atom and R' is a divalent saturated aliphatic phosphorus-linking moiety, preferably $\alpha,\omega$-alkylene, of from 2 to 3 carbon atoms. The group R is an organic group of up to 20 carbon atoms, preferably of up to 10 carbon atoms, which is free from aliphatic carbon-carbon unsaturation, that is, whatever carbon-carbon unsaturation may be present in the R groups is aromatic in character. R is therefore saturated aliphatic, i.e., acyclic saturated aliphatic as well as saturated cycloaliphatic, or is aromatic, preferably mononuclear aromatic, and is a hydrocarbyl radical containing only atoms of carbon and hydrogen or is substituted hydrocarbyl containing in addition to atoms of carbon and hydrogen other atoms such as oxygen, sulfur, nitrogen and halogen, particularly halogen of atomic number from 9 to 35, i.e., fluorine, chlorine or bromine, which additional atoms are present in functional groups such as alkoxy, carbalkoxy, acyl, halo, trihalomethyl, cyano, dialkylamino, sulfonylalkyl and like groups having no active hydrogen atoms. A preferred class of non-hydrocarbyl substitutents comprises an atom having an atomic number from 7 to 8, i.e., oxygen or nitrogen, one valence of which is satisfied by bonding to a carbon atom of an otherwise hydrocarbyl R group, and the remaining valence(s) of which are satified by bonding to lower alkyl radicals which are alkyl of up to 4 carbon atoms. Such preferred oxygen- or nitrogen-containing non-hydrocarbyl substituents are alkoxy wherein the alkyl moiety has up to 4 carbon atoms and N,N-dialkylamino wherein each alkyl independently has up to 4 carbon atoms.

Illustrative of suitable R groups are hydrocarbon alkyl R groups including methyl, ethyl, propyl, isobutyl, lauryl, stearyl, cyclohexyl, cyclopentyl, 3,4-dimethylcyclooctyl and 2-ethylhexyl as well as alkyl radicals having aromatic substituents such as benzyl and $\beta$-phenylethyl; and substituted-hydrocarbyl groups such as 4-bromohexyl methoxymethyl, 3-diethylaminopropyl, 4-carbethoxybutyl and 2-acetoxydodecyl. Aromatic R groups are those wherein the phosphorus moiety is bonded directly to the aromatic ring as exemplified by hydrocarbyl aromatic groups such as phenyl, tolyl, xylyl, p-ethylphenyl, p-tert-butylphenyl, m-octylphenyl, 2,4-diethylpheny, p-phenyphenyl, m-benzylphenyl and 2,4,6-trimethylphenyl; and substituted hydrocarbyl groups such as p-methoxyphenyl, m-chlorophenyl, m-trifluoromethylphenyl, p-propoxyphenyl, p-carbethoxyphenyl, 2,4-dibromophenyl, p-dimethylaminophenyl and p-acetoxyphenyl.

Illustrative of monodentate ligands are the carbonyl ligand and the tertiary mono-phosphine ligands represented by the above-provided formula

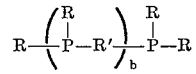

in the instance where the term "$b$" is zero and R has the previously stated significance. Such phosphines are illustrated by triethylphosphine, tributylphosphine, triphenylphosphine, tris(p-methoxyphenyl)phosphine, tris(p-tolyl) phosphine, tris(m-chlorophenyl)phosphine, tris(p-dimethylaminophenyl)phosphine, diphenylhexylphosphine, dimethyl(m - ethoxyphenyl)phosphine, dibutylstearylphosphine, tribenzylphosphine, cyclohexyldiheptylphosphine and methyldicyclohexylphosphine.

Illustrative of bidentate phosphine ligands having two complexing sites are tertiary di-phosphines of the previously provided formula

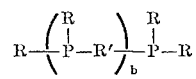

in the instance where the term "$b$" is one and R and R' have the previously stated significance. This class of bidentate ligands includes 1,2-bis(dimethylphosphino)ethane, 1,2-bis(diphenylphosphino)ethane, 1,3-bis(diphenylphosphino)propane, 1,2-bis(methylphenylphosphino)ethane, 1,2-bis(di-p-tolylphosphino)ethane, 1-(dibutylphosphino) - 3 - bis[(p-chlorophenyl)phosphino]-propane and 1,2-bis(dibenzylphosphino)ethane.

The rhodium hydride complexes of the invention contain only tertiary phosphine ligands, either monodentate, bidentate or both, or contain sufficient phosphine ligands to provide a major proportion of the necessary complexing sites with the remainder of the required complexing sites being provided by carbonyl ligand. However, it is considered desirable that no more than one carbonyl ligand be present in the rhodium hydride complex molecule, and preferred hydridorhodium complexes are those wherein all complexing ligands are tertiary phosphine. In the latter instance, the number of complexing sites present in the ligands when considered as a whole is of course equal in magnitude to the total number of phosphorus atoms present.

The rhodium complexes of the invention therefore comprise one atom of rhodium of coordination number from 5 or 6, having respectively 1 or 3 hydrogen substituents, with each of the remaining coordination numbers of the rhodium being satisfied by complex formation through coordination with one of the coordination sites present in no more than one carbonyl ligand and at least one tertiary mono- to di-phosphine ligand as above described.

The rhodium hydride complexes are prepared by several methods. Complexes of the class represented by hydridotris(triphenylphosphine)carbonylrhodium (I), i.e., $[(C_6H_5)_3P]_3Rh(CO)H$, are illustratively prepared by the method of Bath et al., J. Am. Chem. Soc., 85, 3500 (1963). Alternatively, complexes of the class represented by hydridobis(1,2-diphenylphosphinoethane)rhodium (I), i.e., $[(C_6H_5)_2P—CH_2—CH_2—P(C_6H_5)_2]_2RhH$, are illustratively produced by the method of Sacco et al., J. Chem. Soc., 3274 (1964). The class of hydridotetrakistertiary mono-phosphine)rhodium (I) complexes, which class is believed to be novel, is illustratively produced by the method of Example I described below.

In an alternate procedure for the hydridorhodium complexes of the invention, the complex is prepared in situ by phosphine ligand exchange in the hydrogenation process reaction medium. This in situ formation of catalyst complex comprises the addition to the hydrogenation process medium of a comparatively easily prepared phosphine-containing complex together with a molar excess of a tertiary mono-phosphine ligand whose introduction into the complex is desired. Exchange of the added phosphine ligand for the phosphine ligand initially present in the complex, the rate of which is in part controlled by mass law effects, results in the effective presence within the reaction system of the rhodium hydride complex incorporating the ligand added. For example, addition to the reaction medium of a hydridotetrakis(trimethylphosphine)rhodium (I) complex and an excess of triphenylphosphine results in the effective presence in the reaction system of hydridotetrakis(triphenylphosphine)rhodium (I) complex. Although the initial catalyst complex may also contain a carbonyl ligand, it is considered that any ligand exchange as above described involves only phosphine ligands, the carbonyl ligand present, if any, remaining complexed with the rhodium.

In the hydrogenation process of the invention, the rhodium hydride complex is employed in conjunction with an excess of tertiary mono-phosphine complexing ligand which is the same phosphine ligand present in the rhodium complex as introduced or alternatively is a different member of the class of phosphine ligands as previously defined. The amount of excess complexing ligand is of some criticality in obtaining the optimum catalyst composition, as too little an amount of excess complexing ligand does not provide sufficient activity in maintaining catalyst life, whereas too great an excess of complexing ligand actually retards the hydrogenation process, apparently through prevention of the necessary chemical transformations undergone by the catalyst complex during the hydrogenation process. Molar ratios of excess stabilizing ligand from about 10:1 to about 150:1 are generally satisfactory, although molar ratios from about 20:1 to about 100:1 are preferred.

The improved process of the invention comprises utilization of the rhodium hydride complexes to catalyze the homogeneous hydrogenation of an unsaturated organic molecule by contact with molecular hydrogen. The advantage to be gained by use of the present process resides in the efficient catalysis of hydrogenation broadly, rather than in the hydrogenation of any particular type of unsaturated compound, as the process is applicable to the hydrogenation of a number of types of unsaturated molecules. In general, the unsaturated molecules employed in the hydrogenation process contain from 2 to 20 carbon atoms and from 1 to 4 aliphatic carbon-carbon multiple bonds which are preferably ethylenic. One advantage to be obtained, however, resides in the observed selectivity toward hydrogenation of non-aromatic carbon-carbon unsaturation in the presence of unsaturation of other types wherein at least one member of each unsaturated linkage is a carbon atom. Thus, the process is applicable to the hydrogenation of aliphatic carbon-carbon unsaturation in the presence of other types of unsaturated involving a multiple linkage between two atoms at least one of which is carbon such as the unsaturation present in formyl, keto, cyano, carboalkoxy, aromatic carbocyclic and like groups with consequent efficient saturation of the aliphatic carbon-carbon unsaturation and little or no effect on the unsaturation of other types. For example, the hydrogenation of mesityl oxide under the conditions of the process of the invention results in the production of high yields of methyl isobutyl ketone with little or no attendant reduction of the carbonyl moiety. Of course, the process is efficiently utilized in the hydrogenation of unsaturated molecules containing only aliphatic carbon-carbon unsaturation, e.g., the hydrogenation of octene-2 to octane.

Illustrative of other suitable substrates containing aliphatic carbon-carbon ethylenic unsaturation are hydrocarbons such as ethylene, propylene, 1-butene, 1-hexene, 3-octene, cyclopentene, cyclooctadiene, propenylbenzene, biallyl, 2-dodecene, butadiene, isoprene, trivinylbenzene, 2,6,8-octadecatriene and vinylcyclohexene; unsaturated nitriles such as acrylonitrile, 4 - cyanobutene, 2 - methyleneglutaronitrile and methacrylonitrile; unsaturated carbonylic compounds such as methyl vinyl ketone, propyl isopropenyl ketone, crotonaldehyde and cinnamic aldehyde; and unsaturated amides such as N,N-dimethylacrylamide.

The rhodium hydride complex is employed is catalytic quantities. Amounts of rhodium complex from about 0.00001% mole to about 1% mole based upon the material to be hydrogenated are generally satisfactory although amounts of rhodium hydride complex from about 0.0001% mole to about 0.1% mole on the same basis are preferred.

The hydrogenation process is typically conducted in liquid-phase solution in the presence or the absence of an inert solvent that is non-hydrogenatable under the conditions of the reaction. Illustrative solvents include hydrocarbons free from non-aromatic unsaturation such as benzene, toluene, xylene, cument, issoctane, cyclohexane, and methylcyclopentane; nitriles such as propionitrile, acetonitrile and benzonitrile; sulfones such as sulfolane, diethyl sulfone and methyl butyl sulfone; ethers including dialkyl ethers such as diethyl ether, dibutyl ether and propyl hexyl ether, lower alkyl ethers (full) of polyhydric alcohols and poly(oxyalkylene)glycols such as dimethoxyethane, glycerol triethyl ether, diethylene glycol dimethyl ether and tetraethylene glycol diethyl ether; alcohols including lower alkanols such as ethanol, isopropanol, sec-butanol and hexanol, as well as ether-alcohols, e.g., the Cellosolves and the carbitols; and phenols including phenol, p-chlorophenol, m-ethylphenol, m-cresol and m-bromophenol. It is, of course, within the contemplated scope of the process of the invention to employ no reaction solvent as when the catalyst composition is soluble in the unsaturated organic reactant.

The hydrogenation process is typically conducted by mixing the material to be hydrogenated, the solvent if any, the rhodium hydride complex and the excess phosphine ligand in an autoclave or similar pressure vessel and pressurizing the reactor with hydrogen. The method of mixing is not material. One reaction component may be added to the others in increments, although it is equivalently useful to initially mix the entire amounts of reaction mixture components. The hydrogenation process is conducted at convenient temperatures and at an atmospheric or superatmospheric pressure of hydrogen. Suitable reaction temperatures vary from about 0° C. to about 180° C., the optimum temperature depending in part upon the particular catalyst complex and unsaturated organic material employed. Best results are obtained when the reaction temperature is from about 20° C. to about 130° C. Hydrogen pressures from about 1 atmosphere to about 200 atmospheres are generally satisfactory and the reaction pressure range from about 20 atmospheres to about 100 atmospheres of hydrogen is preferred.

Subsequent to reaction, the product mixture is separated and the desired product is recovered by conventional means such as fractional distillation, selective extraction, crystallization, chromatographic techniques and the like.

The products of the hydrogenation process are organic compounds wherein the aliphatic carbon-carbon unsaturation present in the reactant molecule has been saturated by the addition of hydrogen thereto. Illustrative hydrogenation products include propionitrile produced by hydrogenation of acrylonitrile, n-hexane produced by hydrogenation of 1-hexene and butyraldehyde produced by the hydrogenation of crotonaldehyde. As previously stated, the process of the invention is characterized by efficient reduction of aliphatic carbon-carbon unsaturation optionally in the presence of other unsaturation wherein at least one member of each multiple linkage is carbon.

To further illustrate the improved process of the invention and the novel catalyst compositions employed therein, the following examples are provided. It should be understood that the details thereof are not to be regarded as limitations, as they may be varied as will be understood by one skilled in the art.

EXAMPLE I

A series of homogeneous hydrogenations was conducted employing hydridotetrakis(triphenylphosphine) rhodium (I) as catalyst, triphenylphosphine as excess ligand and various unsaturated organic materials. In each case, the catalyst, excess ligand and organic material were charged to an autoclave which was then pressurized with hydrogen to an initial pressure of 600 p.s.i.g. The reaction mixture was maintained at the indicated reaction temperature until the theoretical upstake of hydrogen occurred, whereupon the product mixture was removed and analyzed by gas-liquid chromatography. The results of this series are shown below.

(a) The charge consisted of 10 ml. of acrylonitrile, 30 mg. of the catalyst and 500 mg. of excess ligand. At a reaction temperature of 80° C., the theoretical uptake of hydrogen occurred overnight. Gas-liquid chromatographic analysis indicated that the conversion to propionitrile was quantitative.

(b) In like manner, 30 mg. of the catalyst, 350 mg. of excess ligand and 10 ml. of mesityl oxide were dissolved in 20 ml. m-cresol as solvent and contacted with molecular hydrogen in the above-indicated manner at 90° C. In 2 days the theoretical uptake of hydrogen had taken place and gas-liquid chromatographic analysis of the product mixture showed a 95% yield of methyl isobutyl ketone.

(c) In a similar procedure, to 10 ml. of hexene-1 in 20 ml. of benzene was added 20 mg. of catalyst and 500 mg. of excess ligand. At 76° C., the theoretical uptake of hydrogen occurred in 9 hours and subsequent gas-liquid chromatographic analysis indicated that the yield of hexane was quantitative.

The hydridotetrakis(triphenylphosphine)rhodium (I) employed above was prepared by charging to a reactor 1.0 g. of chlorotris(triphenylphosphine)rhodium (I), prepared according to the procedure of co-pending U.S. application of Dewhirst, Ser. No. 417,482, filed Dec. 10, 1964, 10 ml. of benzene, 10 ml. of ethanol and 4.0 g. of triphenylphosphine. The reaction vessel was purged with hydrogen and 4.0 ml. of hydrazine were added. The hydrogen pressure was increased to approximately 200 p.s.i.g., and the mixture was maintained at 80° C. for 0.5 hour. The product mixture was then cooled and filtered under nitrogen to give 1.1 g. (an 88% yield) of hydridotetrakis(triphenylphosphine)rhodium (I), believed to be a novel compound, as a bright yellow solid. The infrared spectrum of the product was consistent with the above formula and the elemental analysis shown below.

*Analysis* (percent weight).—Anal. calc.: C, 75.0; H, 5.3; Rh, 8.9. Found: C, 74.5; H, 5.8; Rh, 9.3.

EXAMPLE II

The comparative rates of hydrogenation for several catalyst compositions were obtained by charging to a reactor 10 ml. of hexene-1, 20 ml. of propionitrile, 13.8 mg. of hydridotetrakis(triphenylphosphine)rhodium (I) and 250 mg. of various phosphine ligands. The reactor was pressurized with hydrogen to an initial pressure of 600 p.s.i.g., maintained at the indicated temperature, and the initial rate of hydrogenation was determined by measuring the decrease in hydrogen pressure as a function of time. The rates obtained are shown in Table I.

TABLE 1

| Added Ligand | Temp., °C | Rate, p.s.i./hr |
|---|---|---|
| Tris(p-methoxyphenyl)phosphine | 73 | 250 |
| Triphenylphosphine | 74 | 214 |
| Tributylphosphine | 135 | 304 |

EXAMPLE III

For comparison purposes, hydrogenation of hexene-1 was effected at an initial hydrogen pressure of 600 p.s.i.g. employing as catalyst composition excess triphenylphosphine and several hydridobis(1,2-diphenylphosphinoethane)-metal (I) complexes, including a rhodium complex of the present invention. The results obtained are shown in Table II wherein the term "rate" refers to the quantity of hexene-1 hydrogenated as a function of time.

TABLE II

| Metal present in catalyst complex | Catalyst concentration moles/liter | Temp., °C. | Rate millimoles/hr |
|---|---|---|---|
| Co | $5 \times 10^{-3}$ | 150 | 54 |
| Rh | $3 \times 10^{-4}$ | 71 | 130 |

EXAMPLE IV

A series of hydrogenations was conducted employing hydridotris(triphenylphosphine)carbonylrhodium (I) as catalyst and triphenylphosphine as excess ligand to catalyze the hydrogenation of various unsaturated organic molecules. In each case, the reactor was charged with hydrogen to an initial pressure of 600 p.s.i.g. and the mixture was maintained at the indicated temperature until the theoretical hydrogen uptake had occurred. The results of this series are shown in Table III wherein selectivity refers to the yield of hydrogenated product, based on the converted unsaturated reactant, as determined by gas-liquid chromatographic analysis.

TABLE III

| Reactant, ml. | Solvent, ml. | Mg. of catalyst | Mg. of added ligand | Temp., °C. | Time, hrs. | Conversion, percent | Product, percent selectivity |
|---|---|---|---|---|---|---|---|
| Hexene-1, 10 | Propionitrile, 10 | 10 | 250 | 43 | 2 | 79 | Hexane, 100. |
| Acrylonitrile, 10 | None | 10 | 250 | 90 | ~20 | 100 | Propionitrile, 100. |
| Mesityl oxide, 10 | m-Cresol, 20 | 20 | 250 | 90 | 48 | 100 | Methyl isobutyl ketone, 100. |

EXAMPLE V

A series of experiments was conducted to determine the initial rate of hydrogenation obtained by employing as catalyst composition 10 mg. of hydridotris(triphenylphosphine)carbonylrhodium (I) in conjunction with various phosphine ligands (250 mg.) for the catalysis of the hydrogenation of 10 ml. hexene-1 to hexane. The experiments were conducted utilizing the indicated solvent and reaction temperature, and the initial rate of hydrogenation was determined by measuring the decrease in hydrogen pressure as a function of time. The results obtained are shown in Table IV.

TABLE IV

| Ligand | Solvent | Temp., °C. | Rate, p.s.i.g./hr |
|---|---|---|---|
| Triphenylphosphine | Propionitrile | 70 | 660 |
| Do | m-Cresol | 50 | 258 |
| Tris(p-methoxyphenyl)phosphine | do | 50 | 472 |
| Tributylphosphine | Propionitrile | 90 | 166 |

I claim as my invention.

1. In the process for the homogeneous hydrogenation of an unsaturated mono- to di-nitrile which has from 3 to 6 carbon atoms and at least one ethylenic carbon-carbon multiple bond, whereby the ethylenic carbon-carbon multiple bond only is hydrogenated to produce the corresponding saturated mono-to di-nitrile, by contacting said unsaturated nitrile with molecular hydrogen in liquid phase reaction medium, in the presence of homogeneous hydrogenation catalyst which is essentially soluble in the reaction medium, at a temperature of from about 0° C. to about 180° C. and at a pressure of from about 1 atmosphere to about 200 atmospheres, the improvement which comprises employing as the homogeneous catalyst a catalyst composition consisting essentially of (a) rhodium hydride complex of the formula $$L_mRhH(H_2)_n$$

wherein $m$ is a whole number from 3 to 4 inclusive, the sum $m+n$ is 4, and L independently is carbonyl ligand or tertiary mono-phosphine ligand of the formula RRRP, with the proviso that no more than one L is carbonyl and with the additional proviso that two L may together be tertiary di-phosphine of the formula RRP—R'—PRR, wherein R independently is monovalent organic moiety of up to 20 carbon atoms, is free from aliphatic carbon-carbon unsaturation, is bonded to phosphorus by a carbon-phosphorus bond and is selected from unsubstituted saturated aliphatic, unsubstituted phenyl, monosubstituted saturated aliphatic, and monosubstituted phenyl wherein said substituent is free from aliphatic carbon-carbon unsaturation and is selected from alkoxy, carboalkoxy, halo, trihalomethyl, and dialkylamino, and R' is saturated α,ω-alkylene divalent aliphatic phosphorus-linking moiety of from 2 to 3 carbon atoms; and (b) from about 10 to about 150 moles of said mono-phosphine per mole of said rhodium hydride complex.

2. The process of claim 1 wherein the rhodium hydride complex has the formula $$L_4RhH$$

and R is of up to 10 carbon atoms.

3. The process of claim 2 wherein each L independently is said mono-phosphine.

4. The process of claim 3 wherein each L is triphenyl-phosphine.

5. The process of claim 4 wherein said unsaturated nitrile is acrylonitrile.

6. The process of claim 3 wherein each L is tris(p-methoxy-phenyl) phosphine.

7. The process of claim 1 wherein the rhodium hydride complex has the formula $$(RRRP)_3Rh(CO)H$$

and R is of up to 10 carbon atoms.

8. The process of claim 7 wherein each R is phenyl.

9. The process of claim 8 wherein said unsaturated nitrile is acrylonitrile.

References Cited

UNITED STATES PATENTS

| | | | |
|---|---|---|---|
| 2,999,107 | 9/1961 | Lindsey et al. | 260—465.8 |
| 3,110,747 | 11/1963 | Mullineaux | 260—683.9 |
| 3,130,237 | 4/1964 | Wald | 260—683.9 XR |
| 3,133,943 | 5/1964 | Chatt et al. | 260—429 |
| 3,290,343 | 12/1966 | Stone et al. | 260—429 |
| 3,324,018 | 6/1967 | Fotis et al. | 260—683.9 XR |

JOSEPH P. BRUST, Primary Examiner

U.S. Cl. X.R.

260—465.8, 429, 690, 683.9, 666, 668, 593, 601, 599, 561